United States Patent [19]

Dunlap et al.

[11] Patent Number: 5,167,968
[45] Date of Patent: Dec. 1, 1992

[54] APPARATUS FOR FINISHING A BLOW MOLDING

[75] Inventors: Richard L. Dunlap, Cairo; Edward L. Sanford, Lime, both of Ohio

[73] Assignee: Plastipak Packaging, Inc., Plymouth, Mich.

[21] Appl. No.: 667,564

[22] Filed: Mar. 11, 1991

[51] Int. Cl.$^5$ .............................................. B29C 49/74
[52] U.S. Cl. .................................... 425/302.1; 83/663; 83/677; 264/161; 264/536; 425/806
[58] Field of Search ............ 425/527, 531, 806, 302.1; 264/161, 536; 83/677, 663

[56] References Cited

U.S. PATENT DOCUMENTS

| | | | |
|---|---|---|---|
| 2,940,121 | 6/1960 | Sherman | 425/531 X |
| 2,978,745 | 4/1961 | Langecker | 425/531 X |
| 2,984,865 | 5/1961 | Mumford | 425/531 X |
| 4,538,489 | 9/1985 | Takano | 425/527 X |

Primary Examiner—Richard L. Chiesa
Attorney, Agent, or Firm—Brooks & Kushman

[57] ABSTRACT

Apparatus (30) for finishing a blow molding (24) is disclosed as including a rotary head (42) on which a first knife holder (44) is provided for mounting a knife (46) for radial movement with respect to the rotational axis (A). A second knife holder is mounted in a diametrically opposite relationship to the first knife holder and actuated so as to maintain a balanced relationship during rotation of the rotary head. An actuating mechanism (48) actuates the knife holder (44) to move the knife (46) radially inward with respect to the rotational axis (A) during rotation of the head (42) to cut the blow molding received thereby and thereby provide finishing that removes excess material. The actuating mechanism (42) is preferably constructed as a cam actuator (50) including a cam follower (56) and a cam (58) that operate after a first portion (52) of the rotary head (42) is stopped from continued axial movement as a second portion (54) of the rotary head continues to be moved axially during the rotation. A slow down control (178) slows the extension during the cam actuation and thereby provides knife movement sufficiently slow so that the knife (46) completes at least one full rotation after commencing cutting before completing the cutting and thereby prevents a piercing that can cause a wavy cut line.

22 Claims, 9 Drawing Sheets

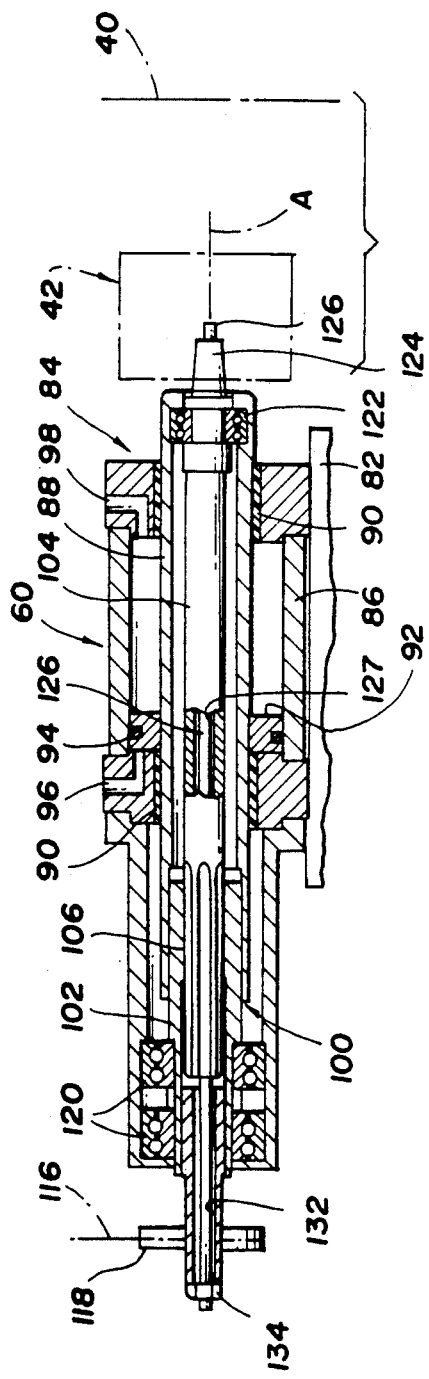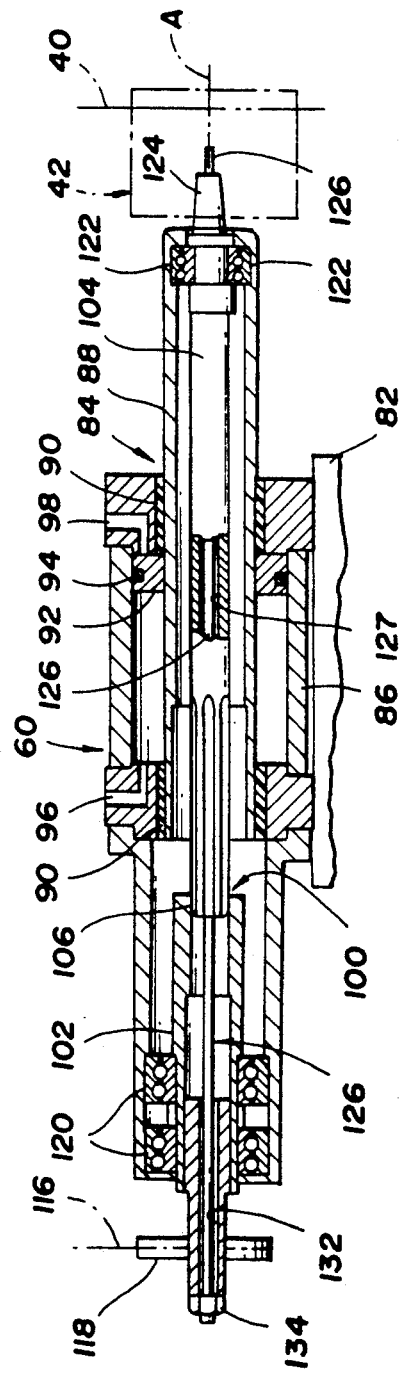

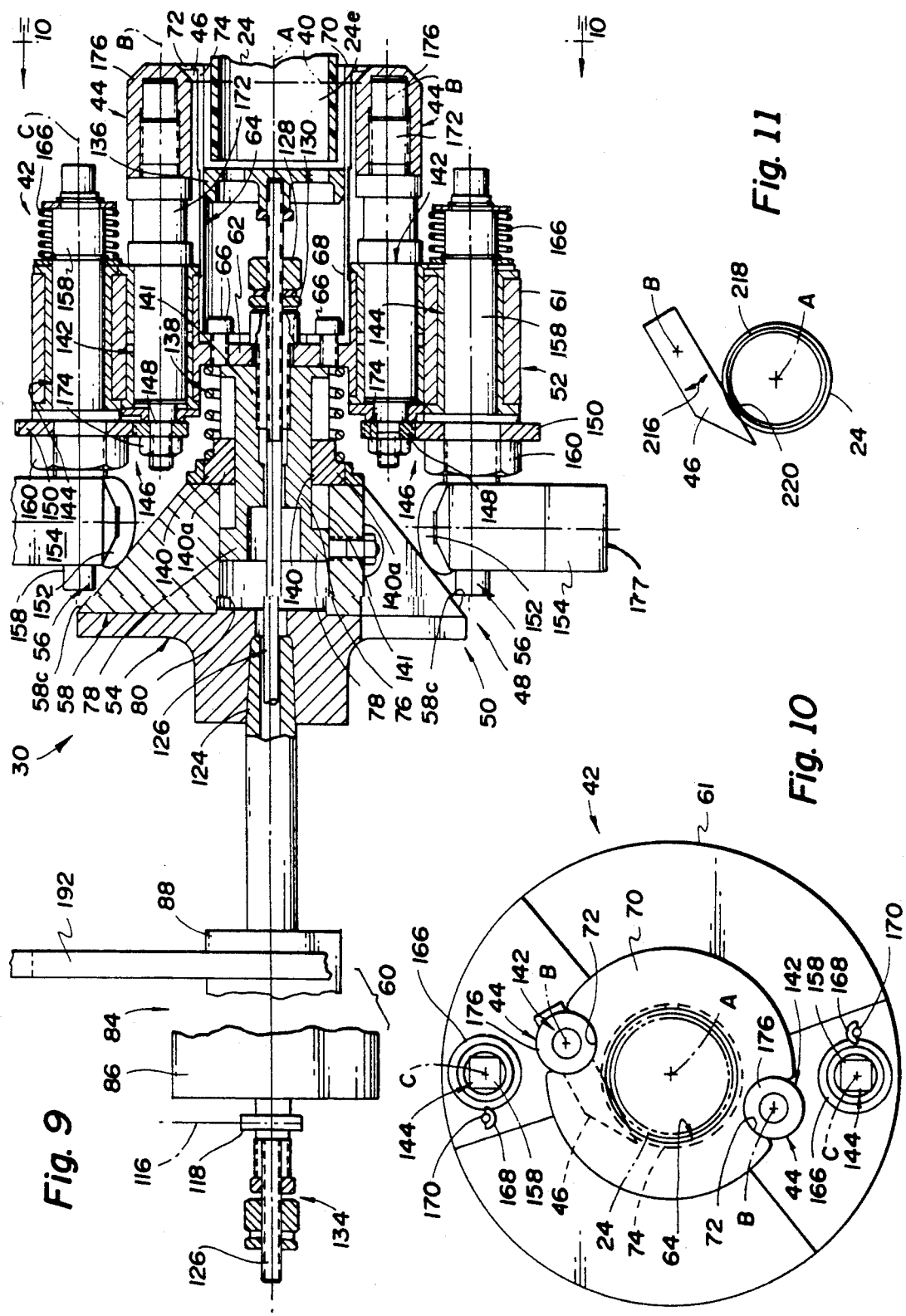

APPARATUS FOR FINISHING A BLOW MOLDING

TECHNICAL FIELD

This invention relates to apparatus and a method for finishing a blow molding by removing excess material.

BACKGROUND ART

Plastic blow moldings which are normally utilized to provide containers are manufactured in accordance with one method by extruding a hollow tubular parison of hot plastic between open portions of a mold which is then closed prior to introducing pressurized air into the interior of the parison. This pressurized air blows the parison outwardly to the shape of a cavity defined by the closed mold portions so as to thereby provide a blow molding that is removed by opening the mold. Excess plastic material referred to as flash is conventionally removed by a reciprocally movable knife in a guillotine fashion to further process the blow molding. At a dispensing neck of the blow molding, further finishing is often also required and is conventionally performed by a rotary reamer that produces plastic particles some of which are received within the interior of the blow molding. These plastic particles must be removed prior to completion of the blow molded article, which is usually performed by either turning the blow molding upside down and blowing air into it so that the cooperation of gravity and the blowing air cleans the interior of the blow molding. These reaming and plastic particle removal operations add to the cost of the completed blow molded article and thus must be born by the ultimate consumer.

DISCLOSURE OF INVENTION

An object of the present invention is to provide improved apparatus and a method for finishing a blow molding.

In carrying out the above object, the apparatus for finishing a blow molding in accordance with the invention includes a rotary head having a rotational axis about which the head rotates- adjacent a blow molding to be finished. A first knife holder of the apparatus is provided for mounting the knife on the rotary head for radial movement with respect to the rotational axis. A second knife holder is mounted on the rotary head in a spaced relationship to the rotational axis and a diametrically opposite relationship to the first knife holder. An actuating mechanism of the apparatus actuates the knife holder to move the knife of the first knife holder radially inward with respect to the rotational axis during rotation of the head to cut the blow molding and thereby provide finishing of the blow molding by removing excess material without forming any plastic particles that must be subsequently removed prior to completion of the blow molded article.

The actuating mechanism includes a cam actuator that actuates the knife holders to move the knife of the first knife holder radially inward with respect to the rotational axis. The rotary head preferably includes a first portion that receives the blow molding to be finished The rotary head also includes a second portion that supports the first portion for axial movement with respect thereto along the rotational axis. The knife holders are mounted on the first portion of the rotary head, and the cam actuator includes a pair of cam followers also mounted on the first portion of the rotary head to respectively the knife holders. A cam of the cam actuator is mounted on the second portion of the rotary head, and the actuating mechanism includes a drive operator that rotates the rotary head and moves the rotary head axially along the rotational axis as well as finally moving the second head portion with respect to the first head portion during the rotation such that the cam moves the cam follower and thereby moves the knife holder such that the knife of the first knife holder cuts the blow molding to remove excess material while maintaining a balanced rotary head during the rotation.

In the preferred construction, the drive operator includes a cylinder that is retractable and extendable and also includes a rotary arbor assembly having a first rotary member that is axially fixed and a second rotary member that is axially movable by extension and retraction of the cylinder. The rotary arbor assembly also has a slide connection between its first and second rotary members, and the rotary head is mounted for rotation and axial movement on the second rotary member of the arbor assembly. A stop of the rotary arbor assembly extends from the first rotary member of the rotary arbor assembly to the rotary head to limit axial movement of the first head portion upon extension of the cylinder as the second head portion continues to move axially such that the cam moves the cam followers to thereby move the knife holders and perform the cutting that provides the excess material removal from the blow molding.

In its preferred construction, the rotary arbor assembly of the apparatus is located within the cylinder of the drive operator and the second rotary member of the arbor assembly has a central bore through which the stop extends from the first rotary member to the rotary head. This stop has a stop portion that engages the first head portion to limit axial movement thereof as the second head portion continues to move axially such that the cam moves the cam follower to thereby move the knife holder. In this preferred construction, the first rotary member of the rotary arbor assembly also has a central bore. Furthermore, the stop extends through the bore of the first rotary member of the arbor assembly and has an external adjuster for adjusting the axial location of the stop portion of the stop with respect to the rotary head to thereby adjust the location at which the first knife holder is actuated to perform the cutting.

Preferably, the rotary head includes a spring that biases the first and second portions of the rotary head axially away from each other. This spring most preferably has a helical shape with a central axis that extends along the rotational axis of the rotary head. The operation of the drive operator thus moves the second portion of the rotary head against the bias of the spring axially along the rotational axis after the stop limits axial movement of the first head portion.

In the preferred construction disclosed, each knife holder has a pivotal support that provides pivotal mounting thereof about a pivotal axis spaced from the rotational axis of the rotary head. According to one embodiment, each knife holder has its pivotal support providing the pivotal mounting thereof on the first portion of the rotary head about its first pivotal axis which is spaced from the rotational axis of the rotary head in a parallel relationship, and the cam follower has a pivotal support that provides pivotal mounting thereof on the first portion of the rotary head about a second pivotal axis that is spaced from both the first pivotal axis of the knife holder and the rotational axis of the rotary head in a parallel relationship. A coupling connects the knife holder and the cam follower for pivotal movement with each other to move the knife holder as the cam follower is pivoted by the cam upon axial movement of the first head portion with respect to the second head portion along the rotational axis of the rotary head. This coupling as disclosed comprises a pair of gears respectively connected to the knife holder and the cam follower. These gears are meshed with each other to pivot the knife holder as the cam follower is pivoted by the cam.

As disclosed, each cam follower includes a follower member engaged with the cam and an arm on which the follower member is mounted. The pivotal support of the cam follower includes a support member that pivots about the second pivotal axis on the first head portion and mounts the arm of the cam follower. A spring biases the support member of the pivotal support of the cam follower to maintain engagement of the cam follower with the cam.

In the one preferred embodiment, the arm of the cam follower includes an end weight on each opposite side of the second pivotal axis from the follower member mounted on the arm. This end weight of the arm of the cam follower generates a centrifugal force as the rotary head rotates to maintain the engagement of the follower member of the cam follower with the cam.

In another preferred embodiment of a modified construction, each knife holder and cam follower have respective pivotal supports mounted on the first portion of the rotary head about a common pivotal axis that is spaced from the rotational axis. A support shaft of this embodiment has an intermediate portion supported by the first portion of the rotary head about said common pivotal axis and has opposite ends that respectively embody the pivotal supports of each knife holder and the associated cam follower. A spring pivotally biases the support shaft to maintain engagement of the cam follower with the cam. This cam follower includes a follower member engaged with the cam and an arm on which the follower member is mounted. The arm of the cam follower is mounted on the end of the support shaft that embodies the pivotal support of the cam follower. The knife holder is mounted on the end of the support shaft that embodies the pivotal support of the knife holder and includes an arm that generates a centrifugal force as the rotary head rotates to pivotally bias the support shaft so as to maintain engagement of the follower member of the cam follower with the cam.

The knife holder of the modified construction has great versatility in cutting blow moldings of great variation in size. This size adjustment is permitted in part by an adjustable connection that permits adjustment of the angular position of the arm on the support shaft end embodying the pivotal support of the knife holder. In addition, the knife holder includes a holder member for holding the knife, and another adjustable connection is provided for mounting the knife holder member on the arm in a spaced relationship from the support shaft while permitting angular adjustment between the holder member and the arm. Furthermore, the holder member includes a connection that permits adjustment of the position of the knife on the holder member.

In order to provide a balanced construction, as previously mentioned each preferred embodiment of the rotary head includes a pair of: knife holders and cam followers, with each mounted on the rotary head in a diametrically opposite relationship to the other with respect to the rotational axis of the rotary head. As such, actuation by the cam actuator to perform the cutting and material removal provides a balanced construction that does not introduce vibrations during the change in the head configuration as the cam followers move the knife holders on the opposite sides of the rotational axis.

Best results are achieved when the apparatus also includes a slow down mechanism that decreases the speed at which the drive operator moves the rotary head axially after the stop limits the axial movement of the first head portion to thereby decrease the speed at which the cam actuator moves the knife holder to perform the cutting.

In carrying out the objects of the invention, the method for finishing a blow molding in accordance with the invention comprises rotating adjacent the blow molding a rotary head having a knife mounted thereon, and moving the knife on the rotary head radially inward with respect to the rotational axis of the rotary head so as to cut through the blow molding and thereby remove excess material. This method is preferably performed by moving the knife radially inward slow enough so as to complete at least one full rotation after commencing the initial cutting before cutting through the blow molding. It has been found that this prevents the knife from making a wavy cut, which takes place when the knife pierces the blow molding before completing one full rotation. Also, the inward movement of the knife is performed in a pivotal manner as previously described in the connection with the apparatus with this inward pivotal movement being slow enough as was also previously described such that the knife completes at least one full rotation after commencing the initial cutting before cutting through the blow molding to remove excessive material.

The objects, features and advantages of the present invention are readily apparent from the following detailed description of the best modes for carrying out the invention when taken in connection with the accompanying drawings.

BRIEF DESCRIPTION OF DRAWINGS

FIG. 6 is a sectional view taken in the same direction as FIG. 3 and illustrates the construction of a drive operator that rotates and moves the rotary head as well as moving the rotary head axially, and is shown with the rotary head positioned prior to commencement of a cycle that performs the cutting to remove excess material in order to finish the blow molding;

FIG. 7 is a sectional view taken through the drive operator in the same direction as FIG. 6 but is illustrated with the rotary head moved axially to perform the cutting for removing excess material to finish the blow molding;

FIG. 9 is a sectional view taken through the rotary head like FIG. 8 but at a further stage of actuation thereof to perform the cutting;

FIG. 10 is an axial view of the rotary head taken along the direction of line 10—10 in FIG. 9 to illustrate the manner in which the knife is moved to perform the cutting that removes excess material to finish the blow molding;

FIG. 11 is a schematic view that illustrates the manner in which the cutting is performed by moving the knife radially inward slow enough so as to complete at least one full rotation after commencing the initial cutting before cutting through the blow molding;

BEST MODES FOR CARRYING OUT THE INVENTION

Figures 1, 2:
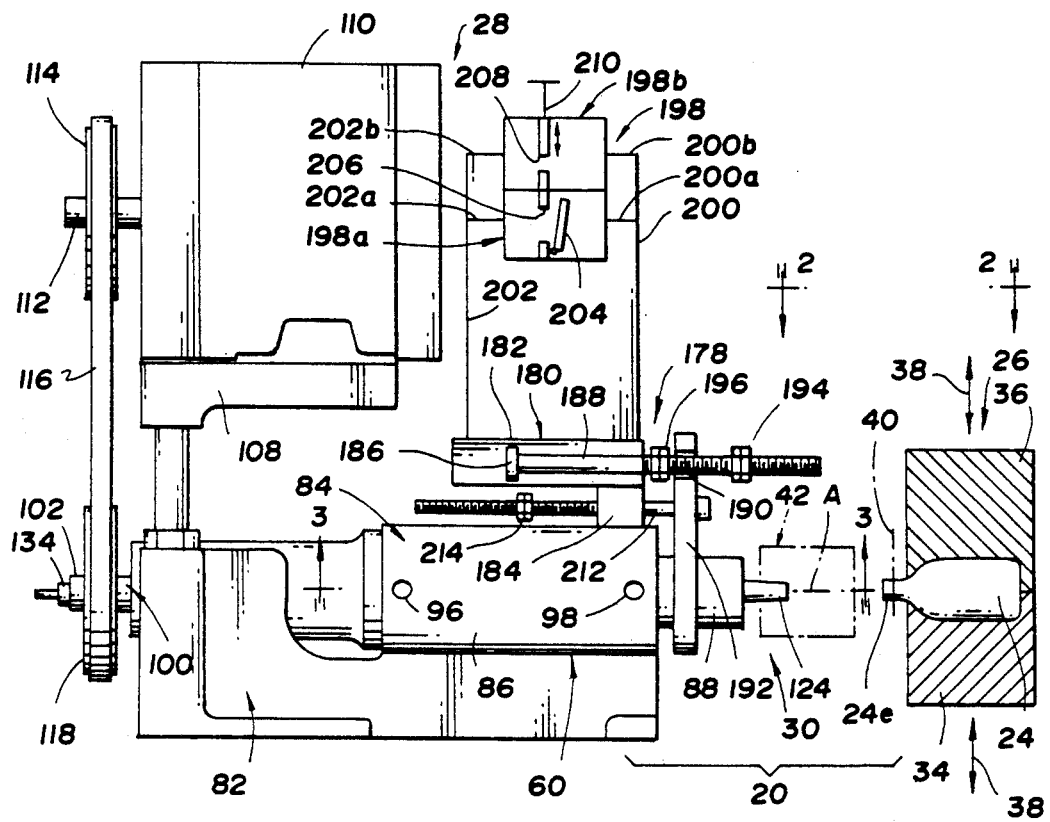
FIG. 1 is a side elevational view taken partially in section to illustrate apparatus that is constructed in accordance with and performs the method of the present invention.
FIG. 2 is a partial top plan view taken along the direction of line 2—2 in FIG. 1 to illustrate the manner in which blow moldings to be finished are conveyed adjacent the apparatus of this invention which performs the finishing.

With reference to FIGS. 1 and 2 of the drawings, a system for finishing blow moldings is identified by 20 and includes a schematically indicated conveyor 22 for conveying blow moldings 24 to be trimmed by removing excess material as is hereinafter more fully described. This finishing is performed at a finishing station 26 located along the conveyor 22 as shown in FIG. 2 and is performed by a finishing machine 28 that is illustrated in FIG. 1. Finishing machine 28 includes apparatus 30 constructed in accordance with the present invention as is hereinafter more fully described in accordance with the method of the present invention. At the finishing station 26 as shown in FIG. 2, a clamp 32 is located and as shown in FIG. 1 has movable lower and upper clamp members 34 and 36 whose vertical movement as shown by arrows 38 cyclically clamps the adjacent blow molding 24 on the conveyor. This clamping provides fixed positioning of the blow molding for the finishing operation performed by apparatus 30 by cutting along a line 40 to remove excess material 24e which is adjacent a round dispensing neck of the blow molding.

Figure 3:
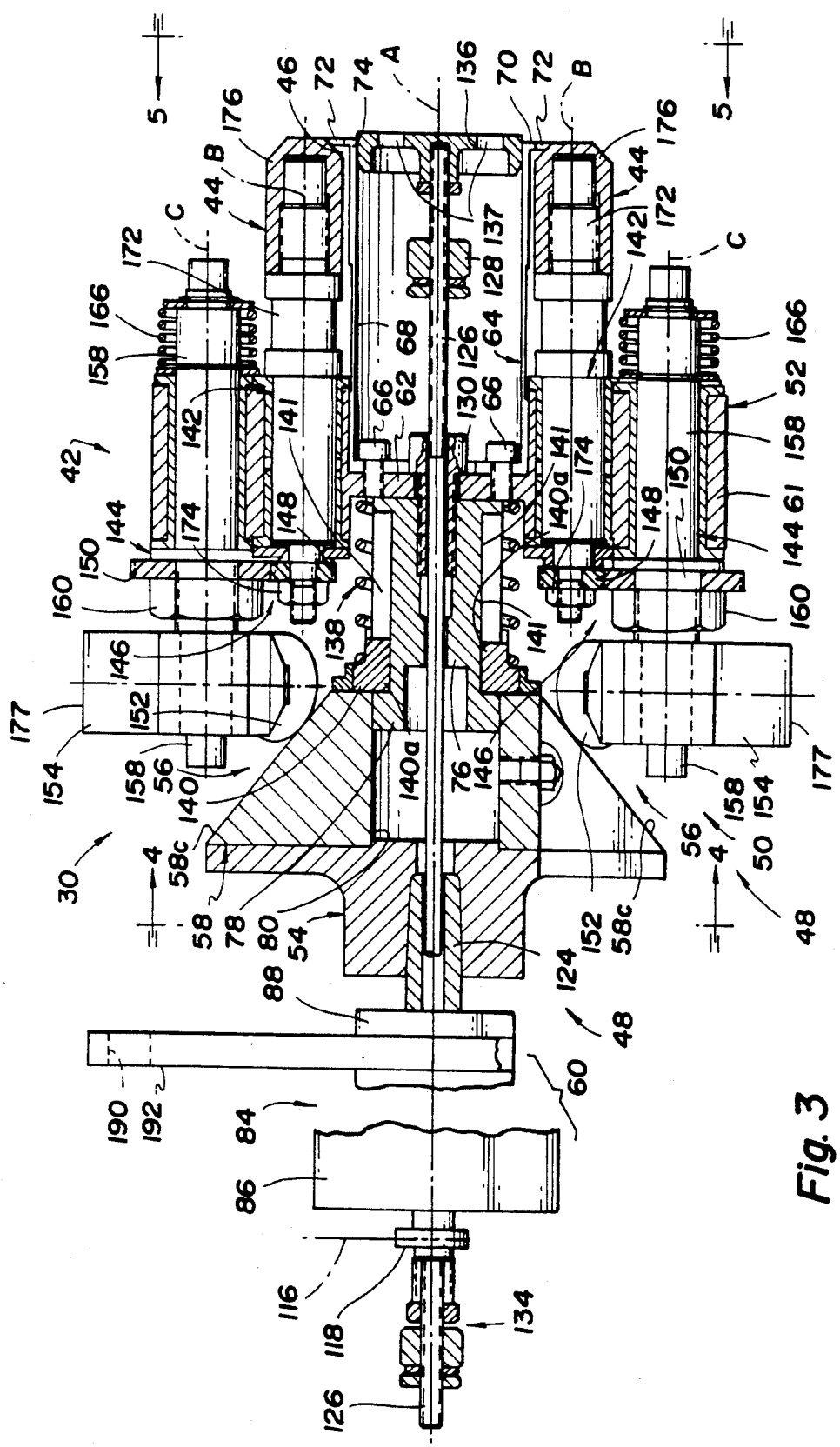
FIG. 3 is a partially schematic sectional view taken generally along the direction of line 3—3 in FIG. 1 to show a rotary head of the apparatus illustrated in its initial position prior to movement from the solid line position to the phantom line position of FIG. 2 to perform the finishing by cutting that removes excess material from the blow molding.
Figure 4:
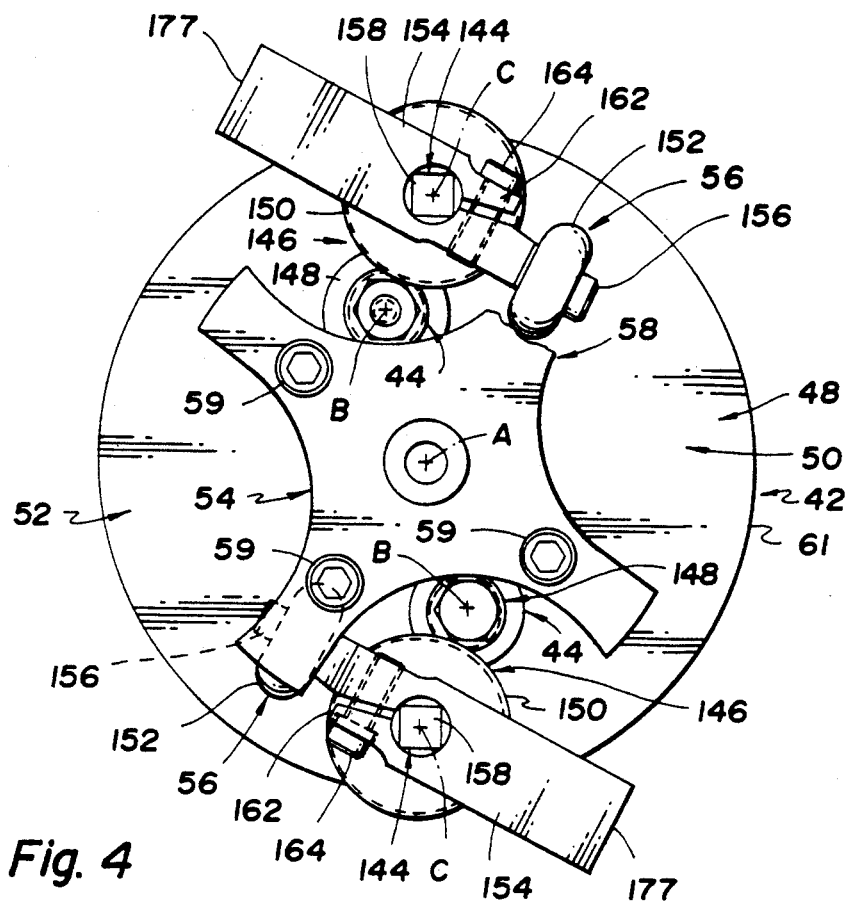
FIG. 4 is a partially broken away axial view of the rotary head taken along the direction of line 4—4 in FIG. 3 to illustrate the construction of a cam actuator.
Figure 5:
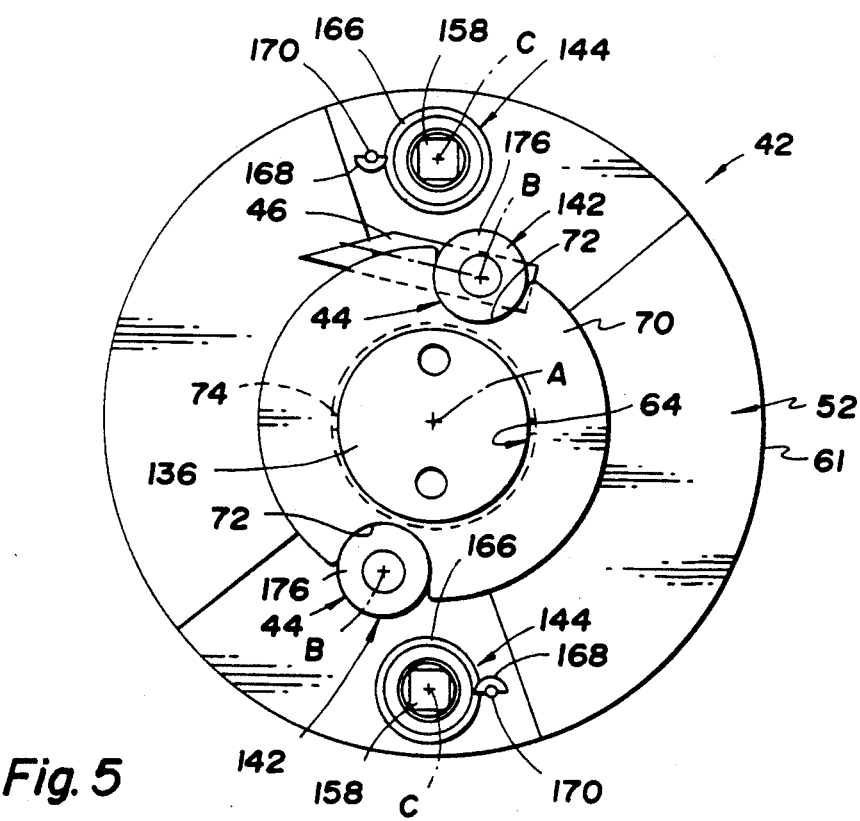
FIG. 5 is an axial view of the rotary head which rotates clockwise as shown and is taken along the direction of line 5—5 in FIG. 3 to illustrate a knife holder that is actuated such that a knife held thereby performs the cutting of the blow molding to remove excess material.

Apparatus 30 of machine 28 includes a rotary head 42 which is illustrated schematically in FIGS. 1 and 2 and in greater detail in FIGS. 3 through 5. This rotary head 42 receives a blow molding to be finished as shown by phantom line representation in FIG. 2 and more completely in FIGS. 8 and 9 as is hereinafter more fully described. During the finishing, the rotary head 42 is rotated adjacent the blow molding 24 about a rotational axis A thereof while the blow molding remains stationary in its clamped condition as described above. A knife holder 44 of the rotary head is illustrated in FIG. 3 and provides mounting of a knife 46 on the rotary head for radial movement with respect to the rotational axis A between the positions of FIGS. 5 and 10. An actuating mechanism 48 of the apparatus 30 is shown in FIGS. 3 and 4 and actuates the knife holder 44 to move the knife 46 radially inward with respect to the rotational axis A during rotation of the rotary head such that the knife moves from the position of FIG. 5 to the position of FIG. 10 to cut the blow molding 24 along the line 40 and thereby provide finishing of the blow molding by removing the excess material 24e. This cutting is performed without producing any plastic particles that must be subsequently removed from the hollow blow molding prior to filling thereof for use.

Figure 8:
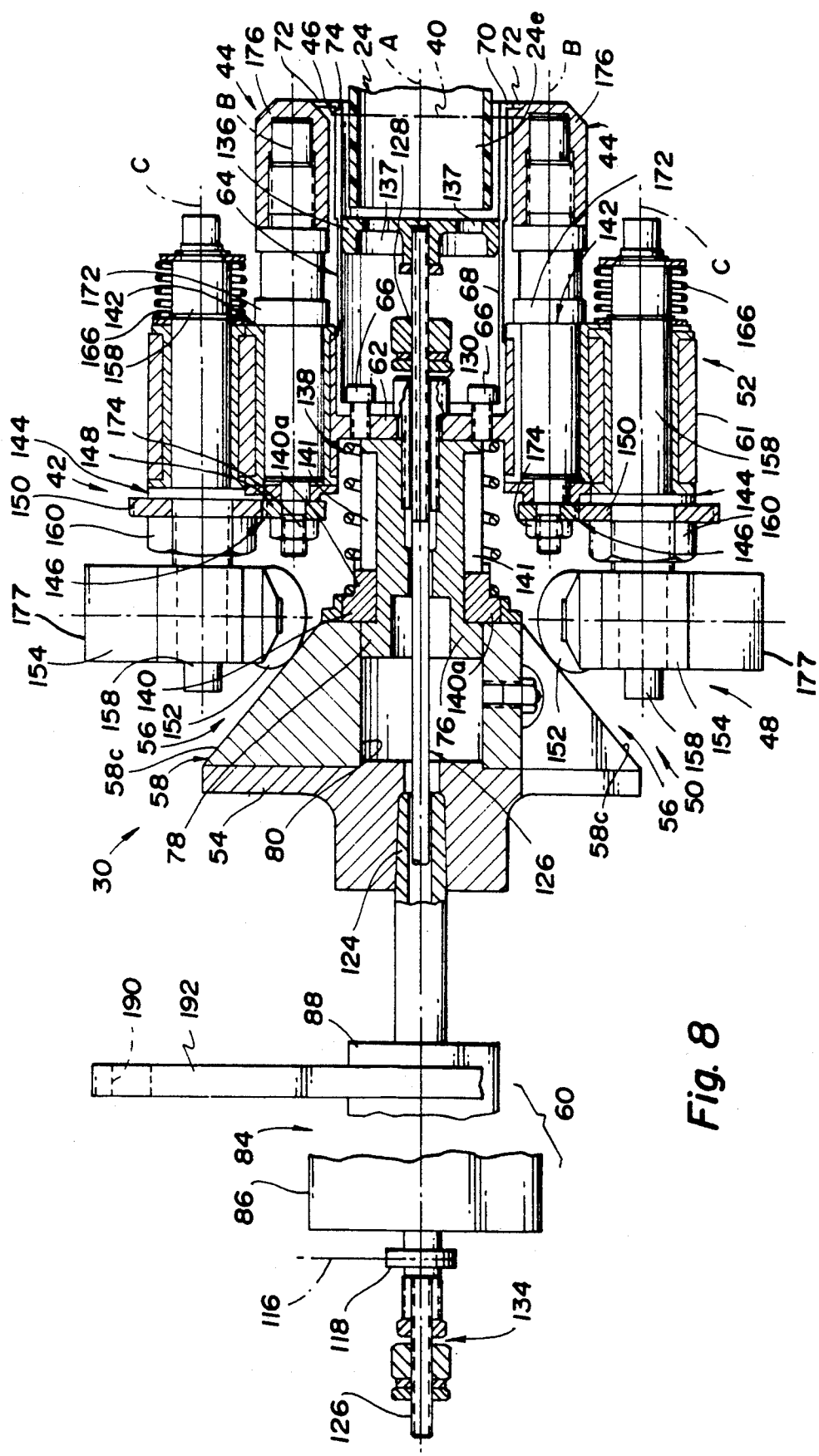
FIG. 8 is a sectional view taken in the same direction as FIG. 3 through the rotary head but is illustrated after an initial axial movement thereof in preparation for performing the cutting.

As illustrated by combined reference to FIGS. 3 and 4, the actuating mechanism 48 is embodied by a cam actuator 50 that operates the knife holder 44 to move the knife radially inward with respect to the rotational axis A from the position of FIG. 5 to the position of FIG. 10. More specifically, the rotary head 42 is supported for rotation adjacent the blow molding 24 to be finished and includes a first portion 52 located adjacent the blow molding as shown in FIG. 9 as well as including a second portion 54 located at a more remote location from the blow molding. The first head portion 52 is supported on the second portion 54 for rotation and for axial movement with respect thereto along the rotational axis A between the positions of FIGS. 3 and 9 as is hereinafter more fully described. The knife holder 44 as shown in FIG. 3 is mounted on the first portion 52 of the rotary head 42 so as to be located adjacent the blow molding upon being received thereby as shown in FIGS. 8 and 9. Cam actuator 50 includes a cam follower 56 mounted on the first portion 52 of the rotary head 42 as shown in FIG. 3 to actuate the knife holder 44 and thereby move the knife as previously described from the position of FIG. 5 to the position of FIG. 10 to perform the cutting that finishes the blow molding. Cam actuator 50 also includes a cam 58 mounted on the second portion 54 of the rotary head 42. This cam 58 is secured to the second head portion 54 by a plurality of bolts 59 shown in FIG. 4 to permit replacement when the cam wears: or when a different cam configuration is required. The rotary head 42 supports a pair of the knife holders 44 and cam followers 56 in a diametrically opposite relationship with respect to the rotational axis A to provide a balanced construction as is hereinafter more fully described. However, only one of the knife holders 44 supports a knife 46 for performing the cutting as illustrated.

Actuating mechanism 48 shown in FIG. 3 also includes a drive operator 60 that is more fully illustrated in FIGS. 6 and 7. This drive operator 60 rotates the rotary head 42 and moves the rotary head axially along the rotational axis A. During the final axial movement as the rotation proceeds, the second head portion 54 moves axially with respect to the first head portion 52 from the position of FIG. 8 to the position of FIG. 9 such that the cam 58 moves the cam follower 56 and thereby actuates the knife holder 44 such that the knife 46 held thereby is moved radially inward and cuts through the blow molding 24 along line 40 to remove the excess material 24e as previously described. Thereafter, the drive operator moves the rotary head 42 back to the position of FIG. 3 in preparation for the next cycle.

As best illustrated in FIGS. 3 through 5, the first portion 52 of the rotary head 42 includes a main member 61 of a round shape having a central web 62 on one side of which one end of a cup member 64 is secured by bolts 66. Cup member 64 has an intermediate portion 68 that extends toward the right to another end of the cup member where a flange 70 is located. This flange 70 as shown in FIG. 5 has a notch 72 for accommodating the adjacent end of the knife holder 44. Just to the left of the flange 72 as illustrated in FIG. 3, the intermediate portion 68 of the cup member 64 has a circumferentially extending slit 74 through which the knife 46 is inserted as shown in FIG. 10 to perform the cutting of the blow molding 24 with the blow molding inserted into the cup member as illustrated in FIG. 9.

With continuing reference to FIG. 3, on the opposite side of the main member 61 of the first head portion 52, a slide member 76 is mounted on the web 62 in any suitable manner such as by fasteners or welding and projects axially along the rotational axis A about which the rotary head rotates. The left end of the slide member 76 includes a slide portion 78 of a round shape that is received within a round slide opening 80 in the second head portion 54 of the rotary head. During the operation of the drive operator 60 as is hereinafter more fully described, the annular interface between the slide portion 78 and the slide opening 80 supports the first rotary head portion 52 for movement along the second rotary head portion 54 from the position of FIG. 3 to the position of FIG. 9 to operate the cam actuator 50 that moves the knife holder 44 and the knife 46 held thereby from the position of FIG. 5 to the position of FIG. 10 to perform the cutting.

As illustrated in FIG. 1, the machine 28 includes a base 82 on which the drive operator 60 is mounted in alignment with the finishing station 26 where the blow moldings 24 are finished. This base mounted drive operator 60 as best illustrated in FIGS. 6 and 7 includes a cylinder 84 that is supported by the base and which is extendable from the position of FIG. 6 to the position of FIG. 7 to perform the cutting operation and is thereafter retractable back to the position of FIG. 6 in preparation for the next cycle. More specifically, the cylinder 84 includes a main cylinder member 86 that is supported by the machine base 82 and has an elongated shape extending along the rotational axis A. A movable cylinder member 88 is supported within the main cylinder member 86 by slide seals 90 for movement between the retracted position of FIG. 6 and the extended position of FIG. 7. An annular piston member 92 is fixedly secured to the intermediate portion of the elongated movable cylinder member 88 and has an annular seal 94 that slidably engages the interior of the main cylinder member 86. Ports 96 and 98 of the main cylinder member 86 receive and discharge pressurized fluid from an unshown suitable fluid control system to force the piston member 92 toward the right for extension of the cylinder to the cutting position of FIG. 7 and back toward the left to the position of FIG. 6 in preparation for the next cycle.

With continuing reference to FIGS. 6 and 7, a rotary arbor assembly 100 supported by the cylinder 84 has a first rotary member 102 that is axially fixed and also has a second rotary member 104 that is axially movable upon extension and retraction of the cylinder by the fluid supplied and discharged through the ports 96 and 98 as previously described. Rotary arbor assembly 100 also includes a slide connection 106 between the first and second rotary members 102 and 104 and is preferably embodied by mated splines that permit the axial movement between the two members while providing rotational coupling therebetween so as to permit the first rotary member 102 to rotatively drive the second rotary member 104.

As illustrated in FIG. 1, the machine base 82 has an upper pedestal 108 that supports an electric motor 110 whose rotary output shaft 112 drives a pulley 114 which receives a continuous drive belt 116 that is also received by a pulley 118 supported on the first rotary member 102 of the rotary arbor assembly 100 so as to thereby provide the driving impetus for rotation of the arbor assembly about the rotational axis A. This first rotary member 102 of the arbor assembly is supported by a pair of antifriction bearings 120 on the main cylinder member 86 adjacent its left end, as illustrated in both FIGS. 6 and 7, just adjacent the drive pulley 118 driven by the belt 116. The second rotary member 104 has its right end supported at the right end of the movable cylinder member 86 by an antifriction bearing 122 while the slide connection 106 supports the left end of the second rotary member 104. Just to the right of the antifriction bearing 122, the second rotary member 104 has a tapered arbor 124 on which the rotary head 42 is mounted for both rotation and axial movement.

As shown by combined reference to FIGS. 3, 6 and 7, a stop 126 extends from the first rotary member 102 of the rotary arbor assembly 100 to the rotary head 42 to limit axial movement of the first head portion 52 upon extension of the cylinder 84 as the second head portion 54 continues to move axially such that the cam 58 moves the cam follower 56 to thereby actuate the knife holder 44 and perform the cutting for the excess material removal from the blow molding.

As previously described, the rotary arbor assembly 100 is located within the cylinder 84 and supported by the antifriction bearings 120 and 122 for rotary movement about the rotational axis A. Stop 126 also extends through the cylinder 84 as shown in FIGS. 6 and 7, and the second rotary member 104 has a central bore 127 through which the stop extends from the first rotary member 102 to the rotary head 42. As illustrated in FIG. 3, the stop 126 which is embodied by a threaded rod within the cup member 64 has a stop portion 128 embodied by an adjustable jam nut assembly that is adjustable along the length of the threaded rod stop. The stop 126 extends through an annular stop seat 130 mounted on the central web 62 of the main member 61 of the first head portion 52. The stop portion 128 of stop 126 engages the stop seat 130 after the drive operator 60 has extended the rotary head 42 sufficiently far so as to receive the blow molding 24 to be trimmed as illustrated in FIG. 8. Such engagement of the stop portion 128 with the stop seat 130 of the first head portion 52 limits further axial movement thereof toward the right as the second head portion 54 continues to be moved axially under the impetus of the drive operator 60 such that the cam 58 moves the cam follower 56 from the position of FIG. 8 to the position of FIG. 9 and thereby moves the knife holder 44 to perform the cutting.

As illustrated by combined reference to FIGS. 3, 6 and 7, the first rotary member 102 of the rotary arbor assembly 100 also has a central bore 132 through which the stop 126 extends outwardly past the drive pulley 118 that drives the arbor assembly as previously described. To the left of the drive pulley 118, the stop 126 is embodied by a threaded rod on which an external adjuster 134 embodied by a jam nut assembly is mounted such that adjustment thereof adjusts the location at which the stop portion 128 engages the stop seat 130 to actuate the knife holder in order to perform the cutting as previously described. Just to the right of the stop portion 128, an ejection plunger 136 is mounted on the stop 126 within the cup member 64 that receives the blow molding for the cutting operation. This ejection plunger is moved from the position of FIG. 9 back to the position of FIG. 3 after the cutting upon retraction of the rotary head by the drive operator 60 as previously described and thereby ejects the trimmed material from the cup member in preparation for the next cycle. Holes 137 in the ejection plunger 136 permit the plunger to be rotated for threading onto an adjacent threaded end of the stop 126 and also permit plunger movement within the cup member 64 without air pressure restricting such movement.

As illustrated in FIG. 3, the rotary head 42 has a spring 138 that biases the first and second portions 52 and 54 thereof axially away from each other. This spring 138 preferably has a helical configuration with a central axis that extends along the rotational axis A of the rotary head 42. One end of the helical spring 138 is seated against the web 62 of the main member 61 of the first portion 52 of the rotary head, while the other end of the helical spring 138 is seated by an annular seat member 140 of the second head portion 54. This seat member 140 surrounds the slide member 76 of the first head portion 52 of the rotary head. Seat member 140 also has key portions 140a slidably received within associated axial slots 141 in the slide member 76 of the first head portion 42 so as to provide rotational driving thereof by the second head portion 54 while still permitting the axial movement between the head portions as previously described.

With combined reference to FIGS. 3 through 5 and 10, the knife holder 44 has a pivotal support 142 that provides pivotal mounting thereof about a first pivotal axis B spaced from the rotational axis A of the rotary head 42. More specifically, this support 142 provides pivotal mounting of the knife holder 44 on the first portion 52 of the rotary head 42 at the main member 61 thereof about pivotal axis B which is spaced from the rotational axis A of the rotary head in a parallel relationship. Cam follower 56 has a pivotal support 144 that provides mounting thereof on the main member 61 of the first head portion 52 about a second pivotal axis C that is spaced from both the first pivotal axis B of the knife holder 44 and the rotational axis A of the rotary head in a parallel relationship.

As illustrated by combined reference to FIGS. 3 and 4, a coupling 146 connects the knife holder 44 and the cam follower 56 for pivotal movement with each other to move the knife holder 44 as the cam follower 56 is pivoted by the cam 58 upon axial movement of the second head portion 54 with respect to the first head portion 52 along the rotational axis A of the rotary head from the position of FIG. 3 to the position of FIG. 9 as previously described. This coupling 146 is preferably embodied by a pair of gears 148 and 150 respectively connected to the knife holder 44 and the cam follower 56. These gears 148 and 150 are meshed with each other as shown in FIG. 4 to thus pivot the knife holder 44 as the cam follower 56 is pivoted by the cam 58.

As illustrated best by combined reference to FIGS. 3 and 4, the cam follower 56 includes a follower member 152 that is engaged with the cam 58 at an inclined cam surface 58c, and the cam follower also includes an arm 154 on which the follower member 152 is mounted. As illustrated in FIG. 4, the follower member 152 is rotatably mounted on a shaft end 156 of the arm 154 so as to engage the cam surface 58c shown in FIG. 3 by rolling contact. The pivotal support 144 of the cam follower also includes a support member 158 that extends through a bushed opening in the main member 61 of the first head portion 52 and has one end that receives a nut 160 as well as supporting the arm 154 on which the follower member 152 is rotatably mounted as previously described. As shown in FIG. 4, the arm 154 has a clamping portion 162 that defines an opening for receiving the support member 158 whose end is square to permit wrench adjustment of the angular position of the knife. The arm clamping portion 162 is tightened against the support member 158 by a bolt 164 to pivotally fix the arm 154 on the support member 158 so as to be pivotal therewith about the axis C. On the opposite side of the main member 61 of the first head portion 52 as shown in FIG. 5, a spring 166 is secured to the support member and also has a hooked end 168 secured to a pin 170 on the main member 61 so as to bias the support member about the pivotal axis C in order to maintain engagement of the cam follower 56 with the cam 58 at the rolling engagement of the follower member 152 with the cam surface 58c as shown in FIG. 3.

As illustrated best in FIGS. 3 and 5, the pivotal support 142 of knife holder 44 includes a support member 172 pivotally mounted about the axis B on the main member 61 of the first head portion 52. One end of this support member 172 receives a nut 174 that secures the gear 148 meshed with the gear 150 of the cam follower 56. The other end of the support member 172 on the opposite side of the main member 61 of the first head portion 52 includes a holder member 176 on which the knife 46 is supported so as to be moved radially inward in a pivotal manner about axis B from the position of FIG. 5 to the position of FIG. 10 as the cam follower 56 is actuated by the cam 58 from the position of FIG. 3 to the position of FIG. 9 so as to pivot the follower member 152 shown in FIG. 4 about its axis C.

As illustrated in FIG. 4, the arm 154 of the cam follower 56 includes an end weight 177 on the opposite side of the second pivotal axis C from the follower member 152 that is mounted on the arm. This end weight 177 generates a centrifugal force as the rotary head 42 rotates to maintain the engagement of the follower member 152 of the cam follower 56 with the cam 58. The centrifugal force is thus transferred from the weighted end 177 of arm 154 through the support member 158 of the pivotal support 144 of the cam follower and hence through the meshed gear coupling 146 to the support member 172 of the knife holder 44. Since the weighted ends 177 of the arms 154 are at a remote location from the reference line 40 where the cutting takes place, the rotary head can cut in relatively confined spaces which is advantageous such as with blow molded containers having an upper handle adjacent the dispensing spout area where the cutting is performed. More specifically, the diameter of the rotary head as shown in FIG. 3 adjacent the knife holders 44 is substantially smaller than the diameter of the rotary head adjacent the arms 154 at the weighted ends 177 of these arms.

As previously mentioned, the rotary head 42 includes a pair of: knife holders 44 and cam followers 56 in a diametrically opposite relationship to each other as shown in FIGS. 4 and 5 with respect to the rotational axis A of the rotary head. As such, movement of the components of the cam actuator 50 during the cutting operation maintains a balanced rotary head and thereby promotes accurate cutting of the blow molding as previously described.

As illustrated in FIG. 1, the apparatus 30 also includes a slow down control 178 that decreases the speed at which the drive operator 60 moves the rotary head 42 axially after the stop 126 reaches the FIG. 8 position where the stop portion 128 is engaged with stop seat 130 to limit axial movement of the first head portion 52 of the rotary head. Such a decrease in the speed of the drive operator 60 thus decreases the speed at which the second head portion 54 is thereafter moved axially to actuate the cam actuator 50 shown in FIG. 3 to move the knife holder 44 and thereby perform the cutting. As is hereinafter more fully described in connection with the method aspect of this invention, this decrease in speed allows the knife 46 to complete at least one full rotation after initially commencing the cutting prior to cutting through the blow molding 24 in a manner that provides more accurate cutting.

With continuing reference to FIG. 1, the slow down mechanism 178 includes a schematically illustrated hydraulic cylinder 180 whose cylinder housing 182 is supported by a mount 184 on the main cylinder member 86 of the cylinder 84 of drive operator 60. A piston 186 is received within the cylinder housing 182 and has a rod 188 that extends outwardly through a slidably sealed opening and through a hole 190 in a plate 192 that is mounted for movement with the movable cylinder member 88 of the cylinder 84 of driver operator 60. The outer end of the piston rod 188 is threaded and receives a pair of jam nut assemblies 194 and 196 on the opposite side of the plate 192. A valve assembly 198 is connected by conduits 200 and 202 to the cylinder housing 182 of the cylinder 180 of the slow down control 178. This valve assembly 198 includes a check valve 198a having a valve element 204 that permits unrestricted flow through an opening 206 in one direction but prevents any fluid flow in the other direction. Valve assembly 198 also includes a leakage flow valve 198b having an opening 208 whose size is adjustable by operation of an adjuster 210 to provide an adjustable resistance to fluid flow. Conduit portions 200a and 200b respectively communicate the conduit 200 with one side of the valves 198a and 198b of the valve assembly 198, and conduit portions 202a and 202b likewise respectively communicate the conduit 202 with the other side of the valves 198a and 198b of the valve assembly 198.

As also illustrated in FIG. 1, the plate 192 carried by the movable cylinder member 88 of the cylinder 84 of drive operator 60 supports a stop rod 212 that extends through an opening in the mount 184 in a parallel relationship to the rotational axis A and receives a jam nut assembly 214 that engages the mount 184 upon the extension of the cylinder 84 to limit the movement of the movable cylinder member 88 and through conventional unshown controls provide reverse driving of the cylinder 84 after the cutting has been completed, such that the cylinder 84 then moves the rotary head 42 from the position of FIG. 9 back to the position of FIG. 3 in preparation for the next cycle.

Operation of the slow down control 178 shown in FIG. 1 takes place as the cylinder 84 of drive operator 60 moves the movable cylinder member 88 toward the right as the rotation proceeds through the driving impetus of the electric motor 110 as previously described. During the initial movement, the plate 192 is freely movable between the jam nut assemblies 194 and 196 of the piston rod 188 of cylinder 180 of the slow down control 178. However, at approximately the same time the stop portion 128 of the stop 126 is engaged with the stop seat 130 as shown in FIG. 8, the plate 192 engages the one jam nut assembly 194 and thereafter moves the piston 186 whose movement to the right is restricted by the fluid flow through conduit 200 into the valve portion 198b and through the valve opening 208 whose adjustment allows the slow down to be controlled to the desirable extent. As such, the continued axial extension of the cylinder 88 operates the cam actuator 50 such that the knife holder 44 shown in FIG. 5 moves the knife 46 inwardly to the position of FIG. 10 at a slow enough rate so that at least one complete rotation is made after commencing the cutting before cutting through the blow molding 24. After the extension of the movable cylinder member 88 proceeds sufficiently far so that the jam nut assembly 214 engages an unshown actuator to actuate reverse driving of the cylinder 84, the movable cylinder member 88 is retracted as previously described in connection with FIGS. 6 and 7 and eventually engages the jam nut assembly 196 to move the piston 186 back to its initial position illustrated in FIG. 1 as the valve portion 198a permits the free flow of fluid through the opening 206 so that there is no slow down during the retraction.

As is generally apparent from the preceding description of the apparatus 30, the method of this invention for finishing the blow molding 24 comprises rotating adjacent the blow molding the rotary head 42 with a knife 46 mounted thereon. The method also involves moving the knife 46 on the rotary head 42 radially inward with respect to the rotational axis A of the rotary head 42 so as to cut through the blow molding 24 and thereby remove the excess material 24e. The knife 46 is preferably moved radially inward slow enough so as to complete at least one full rotation after commencing the initial cutting before cutting through the blow molding as illustrated in FIG. 11. In actuality, the knife movement is sufficiently slow so that the knife completes several full rotations after commencing the initial cutting before cutting through the blow molding. This is achieved as previously described in connection with the apparatus by use of the previously described slow down control 178 without slowing the entire movement of the cylinder 84 of the drive operator 60 during the rest of the cycle. Knife 46 as previously described in connection with the apparatus is pivotally moved as shown by the curved arrow 216 in FIG. 11 about the axis B of the knife holder and forms a cut groove 218 at its cutting edge 220 as a result of the slow down provided by the apparatus during the cutting phase.

Figure 12:
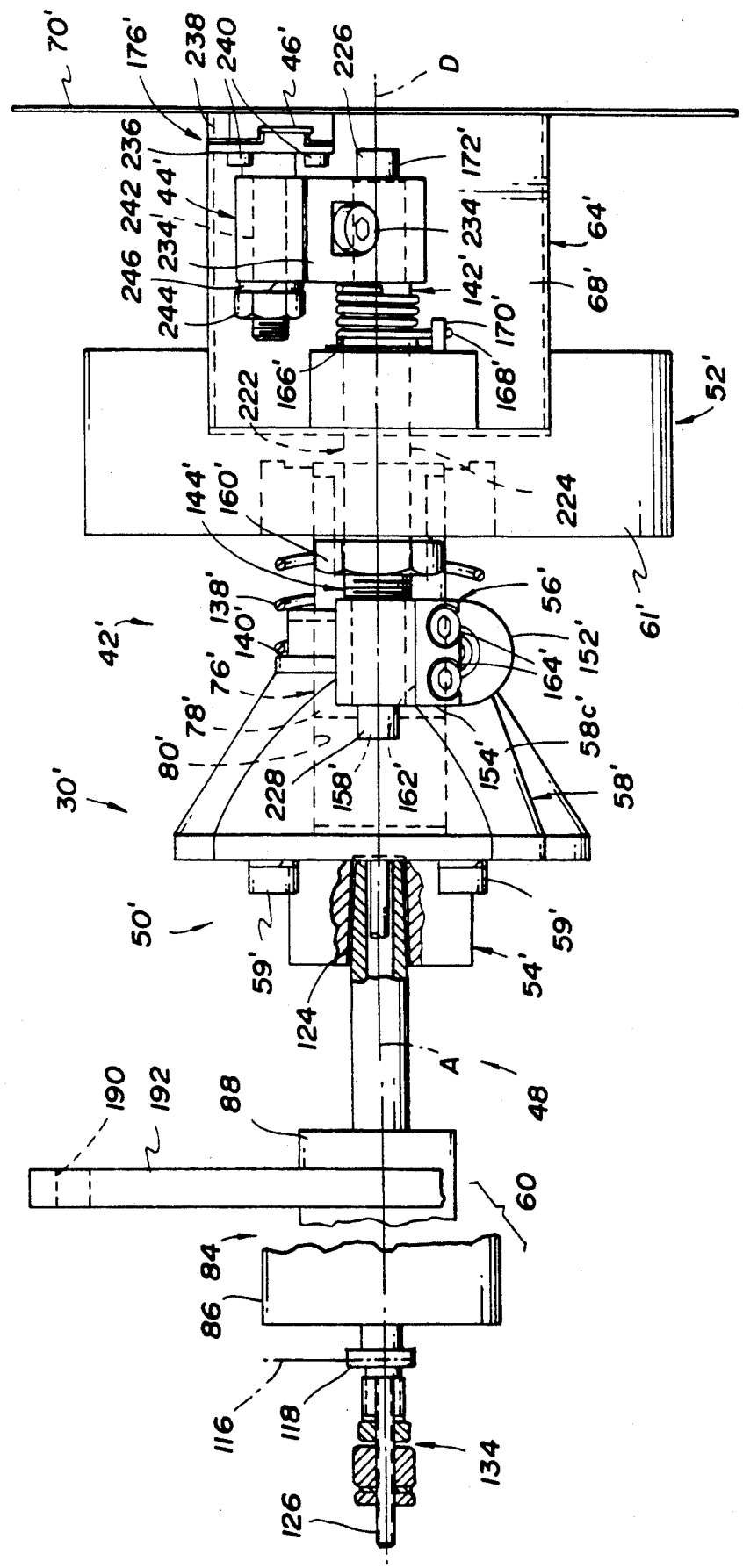
FIG. 12 is a side view taken in the same direction as FIG. 3 but illustrating a modified embodiment of the rotary head.
Figure 13:
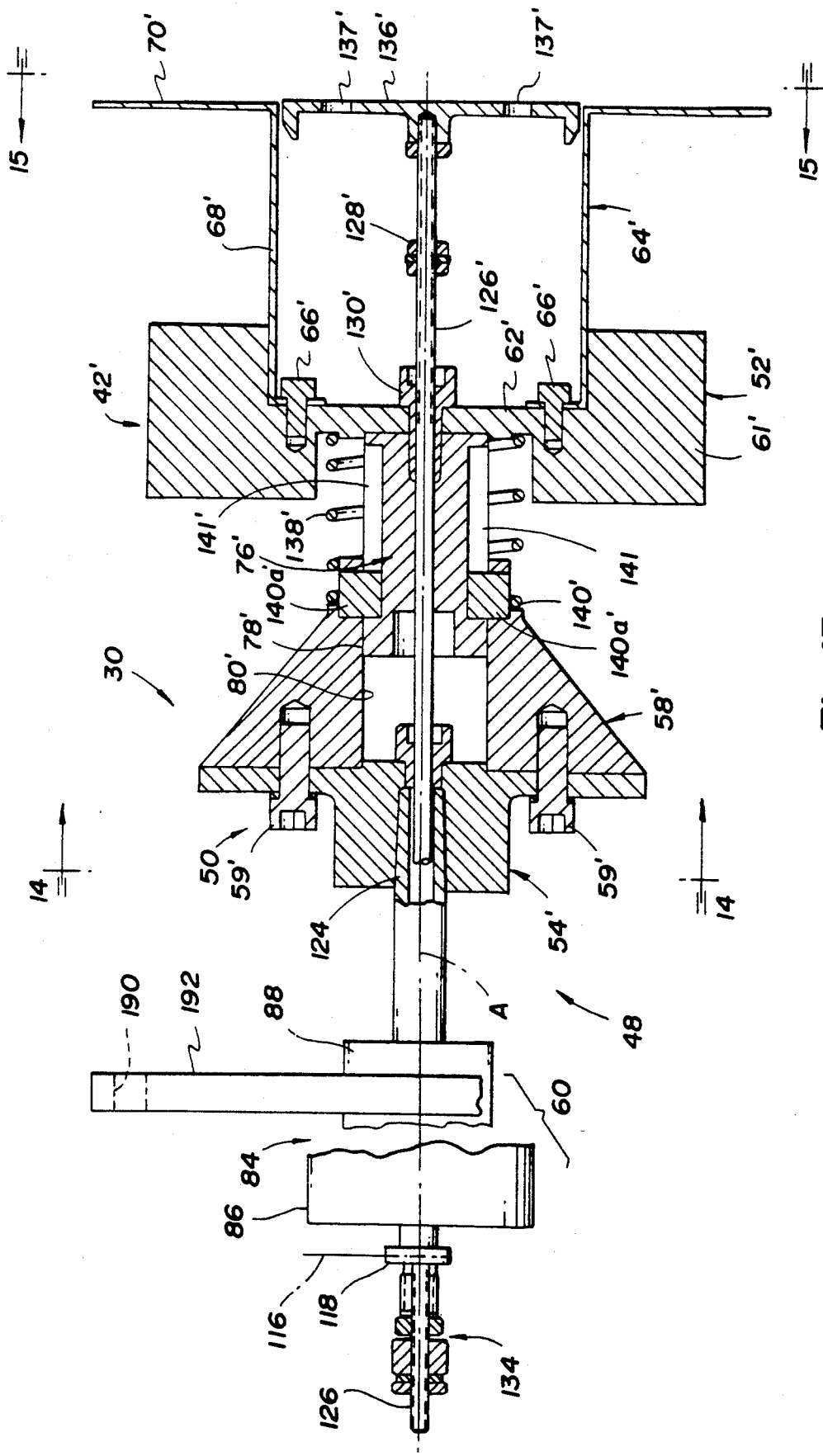
FIG. 13 is a view similar to FIG. 12 but taken in section to further illustrate the construction of the modified rotary head.

With reference to FIGS. 12 and 13, the apparatus 30 is illustrated with a modified embodiment of the rotary head 42' whose construction is the same as the previously described embodiment except as will be noted such that primed reference numerals are utilized to identify like components thereof and much of the previous description is applicable and thus need not be repeated.

The modified embodiment of the rotary head 42' is illustrated in FIGS. 12 through 15 and has its knife holder 44' and cam follower 56' provided with pivotal supports 142' and 144' mounted on the first portion 52' of the rotary head about a common pivotal axis D that is spaced from the rotational axis A in a parallel relationship. This construction thus differs from the previously described embodiment wherein the knife holder and the cam follower have their pivotal supports mounted on the first portion of the rotary head about separate axes that are spaced from each other and from the rotational axis.

As best illustrated in FIG. 12, rotary head 42' includes a support shaft 222 having an intermediate portion 224 supported on the main member 61' of the first portion 52' of the rotary head about the common pivotal axis D of the knife holder and the cam follower. This support shaft 222 has opposite ends 226 and 228 that respectively embody the pivotal supports 158' and 172' of the cam follower and the knife holder. A spring 166' is of a helical shape encircling the support shaft 222 on the side of the main member 61' of the first head portion 52' adjacent the shaft end 226 that provides the pivotal support 172' of the knife holder 44'. This spring 166' has one end fixed to the support shaft 222 and has another end 168' secured to a pin 170' on the main member 61' of the first head portion 52' so as to bias the support shaft to maintain engagement of the cam follower 56' with the cam 58'.

Figure 14:
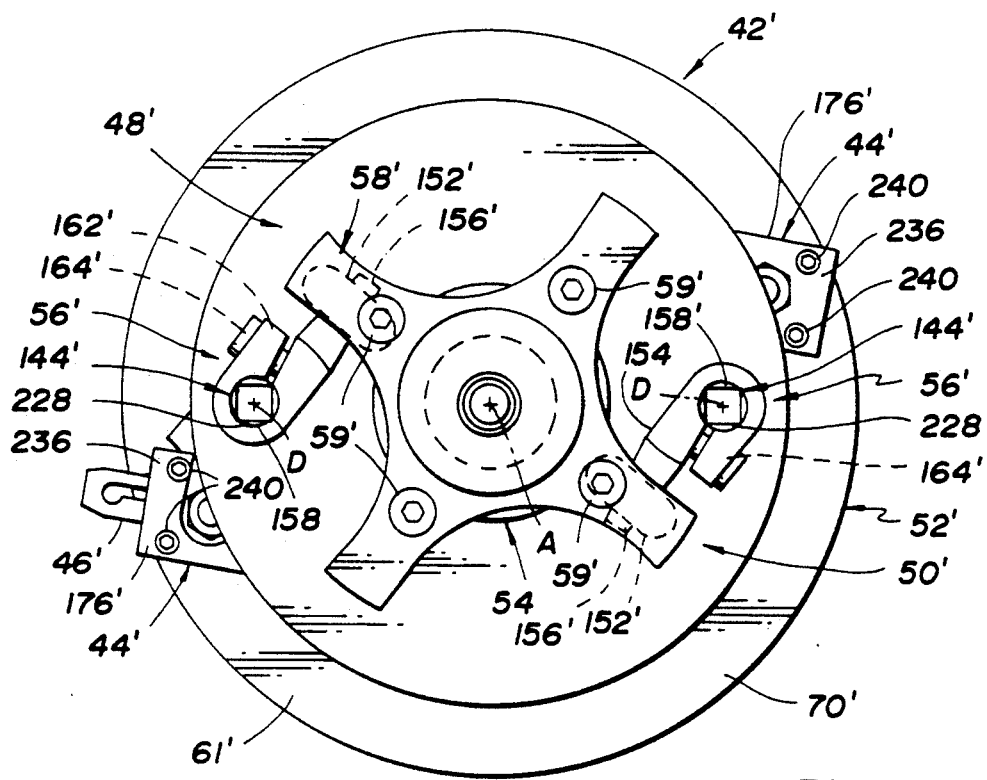
FIG. 14 is an end view of the modified rotary head taken along the direction of line 14—14 in FIG. 13 to illustrate the construction of a cam actuator.

As best illustrated in FIG. 14, this modified embodiment of the rotary head 42' like the previously described embodiment has two pairs of: knife holders 44' and cam followers 56' in a diametrically opposite relationship to each other with respect to the rotational axis A so as to provide a balanced construction even during the cam actuated rotation of the one knife holder 44' that carries the knife 46' for providing the cutting of the blow molding to remove excess material.

As illustrated in FIG. 14, the modified rotary head 42' has the cam follower 56' constructed to include a follower member 152' engaged with the cam 58' and also has an arm 154' with an end 156' on which the follower member 152' is mounted. This arm 154' includes a clamping portion 162' secured by bolts 164' so as to provide an angularly adjustable connection for clamping onto the end 228 of the support shaft that embodies the pivotal support 144' of the cam follower. Furthermore, as illustrated best in FIG. 15, the knife holder 44' is mounted on the end 226 of the support shaft that embodies the pivotal support of the knife holder and includes an arm 230 that generates a centrifugal force as the rotary head rotates to pivotally bias the support shaft in order to maintain the engagement of the cam follower member 152' shown in FIGS. 12 and 14 with the cam 58'. This arm 230 includes a clamping portion 232 secured by a bolt 234 so as to provide an adjustable connection that permits angularly adjustable positioning of the knife holder arm 230 on the support shaft end 226 that provides the pivotal support 172' for the knife holder.

Figure 15:
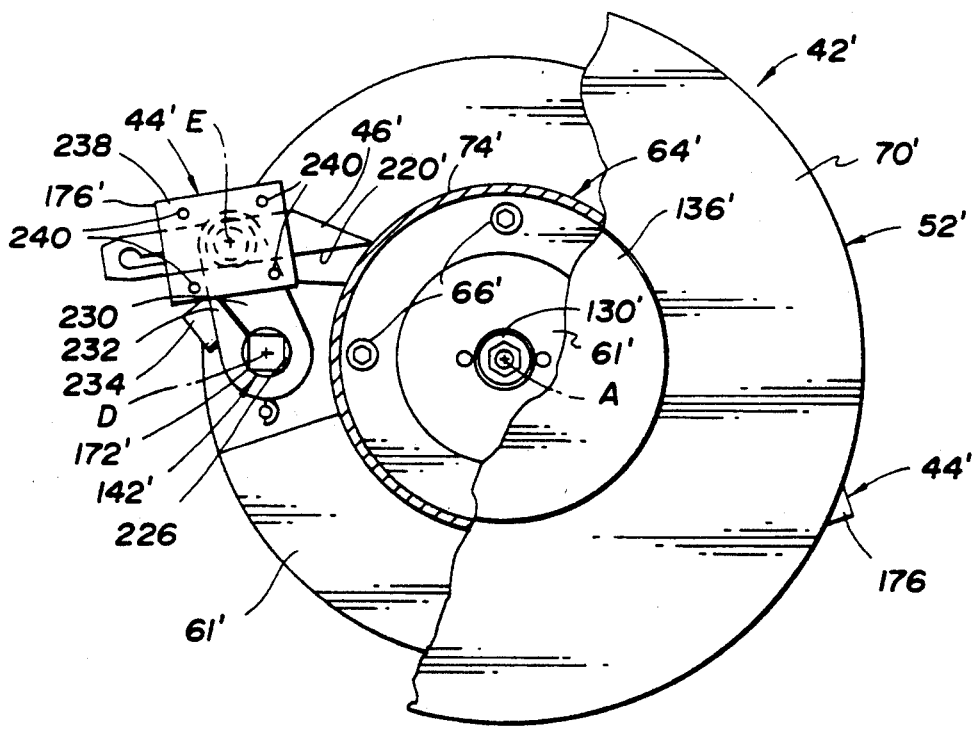
FIG. 15 is a partially broken away axial view of the modified rotary head which rotates counterclockwise as shown and is taken along the direction of line 15—15 in FIG. 13 to illustrate the construction of a knife holder that is actuated such that a knife held thereby performs the cutting of the blow molding to remove excess material.

As illustrated in FIG. 12, the knife holder member 176' includes first and second holder portions 236 and 238 having a mated groove and key adjustable connection between which the knife 46' is secured by bolts 240. The connection permits adjustment of the extend the knife projects outwardly from the holder. An adjustment bolt 242 is fixed to the one holder portion 236 and extends therefrom through a hole in the end of the arm 230 to support the knife holder member 176' on the end of the arm 230 at an axis E. A nut 244 and cooperable lock washer 246 adjustably secure the adjustment bolt 242 as shown in FIG. 15 to provide an adjustable connection that permits angular adjustment of the knife holder member 176' on the end of the arm about axis E.

The embodiment of the rotary head 42' illustrated in FIGS. 12 through 15 can accommodate a great variation in the size of the blow molded portion to be cut, i.e. the embodiment illustrated can cut from about an inch or so to several inches in diameter. All that need be done is to replace the cup member 64' and associated plunger 136' so as to have the appropriate diameter and to then adjust the knife holder 44'. This adjustment can be performed by: (a) adjusting the angular position of the arm 230 about the pivotal axis D; (b) adjusting the angular location of the knife 176' about the axis E on the end of the arm 230; and/or (c) adjusting the extent to which the knife 46' projects outwardly from the knife holder member 176'. While this embodiment has a greater extent of adjustment for the reasons discussed, the previously described embodiment is advantageous for having a greater capability to perform the cutting in confined spaces such as adjacent a blow molded container spout having an adjacent handle.

While the best modes for carrying out the invention has been described in detail, those familiar with the art to which this invention relates will recognize various alternative ways of carrying out the invention as described by the following claims.

What is claimed is:

1. Apparatus for finishing a blow molding comprising:

a rotary head having a rotational axis about which the head rotates adjacent a blow molding to be finished, and the rotary head including a first portion that receives the blow molding to be finished and also including a second portion that supports the first portion for axial movement with respect thereto along the rotational axis;

a first knife holder mounted on the first portion of the rotary head in a spaced relationship to the rotational axis and having means for mounting a knife on the rotary head for radial movement with respect to the rotational axis;

a second knife holder mounted on the first portion of the rotary head in a spaced relationship to the rotational axis and a diametrically opposite relationship to the first knife holder; and an actuating mechanism including a cam actuator that actuates the first and second knife holders to move the knife mounted by the first knife holder radially inward with respect to the rotational axis during rotation of the head to cut the blow molding and thereby provide finishing of the blow molding by removing excess material, the cam actuator including a pair of cam followers mounted on the first portion of the rotary head to respectively move the first and second knife holders, the cam actuator also including a cam mounted on the second portion of the rotary head, and the actuating mechanism including a drive operator that rotates the rotary head and moves the rotary head axially along the rotational axis and finally moves the second head portion with respect to the first head portion during the rotation such that the cam moves the cam followers and thereby moves the knife holders such that the knife held by the first knife holder cuts the blow molding to remove excess material while maintaining a balancing rotary head during rotation.

2. Apparatus as in claim 1 wherein the drive operator includes a cylinder that is extendable and retractable, a rotary arbor assembly supported by the cylinder and including a first rotary member that is axially fixed and a second rotary member that is axially movable by extension and retraction of the cylinder, the rotary arbor assembly also having a slide connection between the first and second rotary members thereof, the rotary head being mounted for rotation and axial movement on the second rotary member of the arbor assembly, and a stop that extends from the first rotary member of the rotary arbor assembly to the rotary head to limit axial movement of the first head portion upon extension of the cylinder as the second head portion continues to move axially such that the cam moves the cam followers to thereby move the knife holders such that the first knife holder performs the cutting that provides the excess material removal from the blow molding.

3. Apparatus as in claim 2 wherein the rotary arbor assembly is located within the cylinder of the drive operator, the second rotary member of the arbor assembly having a central bore through which the stop extends from the first rotary member to the rotary head, and the stop having a stop portion that engages the first head portion to limit axial movement thereof as the second head portion continues to move axially such that the cam moves the cam followers to thereby move the knife holders.

4. Apparatus as in claim 3 wherein the first rotary member of the rotary arbor assembly has a central bore, and the stop extending through the central bore of the first rotary member of the arbor assembly and having an external adjuster for adjusting axial location of the stop portion of the stop with respect to the rotary head to thereby adjust the location at which the knife holders are actuated to perform the cutting.

5. Apparatus as in claim 3 wherein the rotary head includes a spring that biases the first and second portions thereof axially away from each other.

6. Apparatus as in claim 5 wherein the spring has a helical configuration with a central axis that extends along the rotational axis of the rotary head.

7. Apparatus as in claim 1 wherein each knife holder has a pivotal support that provides pivotal mounting thereof about a pivotal axis spaced from the rotational axis of the rotary head.

8. Apparatus as in claim 1 wherein each knife holder has a pivotal support that provides pivotal mounting thereof on the first portion of the rotary head about a first pivotal axis that is spaced from the rotational axis of the rotary head in a parallel relationship, each cam follower having a pivotal support that provides pivotal mounting thereof on the first portion of the rotary head about a second pivotal axis that is spaced from both the first pivotal axis of the associated knife holder and the rotational axis of the rotary head in a parallel relationship, and a coupling that connects each knife holder and the associated cam follower for pivotal movement with each other to move the knife holder as the associated cam follower is pivoted by the cam upon axis movement of the second head portion with respect to the first head portion along the rotational axis of the rotary head.

9. Apparatus as in claim 8 wherein the coupling comprises a pair of gears respectively connected to the associated knife holder and the associated cam follower, and the gears of the coupling being meshed with each other to pivot the associated knife holder as the cam follower is pivoted by the cam.

10. Apparatus as in claim 8 wherein each cam follower includes a follower member engaged with the cam and wherein each cam follower also includes an arm on which the associated follower member is mounted, the pivotal support of each cam follower including a support member that pivots about the associated second pivotal axis on the first head portion and mounts the arm of the cam follower, and a spring that biases the support member of the pivotal support of each cam follower to maintain engagement of the follower member of the cam follower with the cam.

11. Apparatus as in claim 10 wherein the arm of each cam follower includes an end weight on the opposite side of the associated second pivotal axis from the follower member thereof mounted on the arm thereof such that the end weight generates a centrifugal force as the rotary head rotates to maintain the engagement of the follower member of the cam follower with the cam.

12. Apparatus as in claim 1 wherein each knife holder and the associated cam follower have respective pivotal supports mounted on the first portion of the rotary head about a common axis that is spaced from the rotational axis.

13. Apparatus as in claim 12 wherein each knife holder and associated cam follower further includes a support shaft having an intermediate portion supported on the first portion of the rotary head bout said common pivotal axis, each support shaft having opposite ends that respectively embody the pivotal supports of the associated knife holder and the associated cam follower, and a spring that pivotally biases the support shaft to maintain engagement of the cam follower with the cam.

14. Apparatus as in claim 12 wherein each cam follower includes a follower member engaged with the cam and an arm on which the follower member is mounted, the arm of each cam follower being mounted on the end of the associated support shaft that embodies the pivotal support of the cam follower, and each knife holder being mounted on the end of the support shaft that embodies the pivotal support of the knife holder and including an arm that generates a centrifugal force as the rotary head rotates to pivotally bias the support shaft so as to maintain the engagement of the follower member of the cam follower with the cam.

15. Apparatus as in claim 14 wherein each knife holder further includes an adjustable connection that permits adjustment of the angular position of the arm thereof on the associates support shaft end embodying the pivotal support of the knife holder.

16. Apparatus as in claim 14 or 15 wherein the first knife holder includes a holder member for holding the knife, the first knife holder including an adjustable connection for mounting the knife on the arm thereof in a spaced relationship from the associated support shaft while permitting angular adjustment between the holder member and the arm, and the second knife holder including a holder member and an adjustable connection for mounting the holder member thereof on the arm thereof while permitting angular adjustment.

17. Apparatus as in claim 16 wherein the holder member of the first knife holder includes a connection that permits adjustment of the position of the knife.

18. Apparatus as in claim 2, 3, 7 or 12 further including a flow down control that decreases the speed at which the drive operator moves the rotary head axially after the stop limits the axial movement if the first head portion to thereby decrease the speed at which eh cam actuator moves the knife holders to initiate the cutting by the first knife holder.

19. Apparatus for finishing a blow molding comprising:
- a rotary head rotatable about a rotational axis adjacent a blow molding to be finished, said rotary head including a first portion and a second portion that supports the first portion for axial movement with respect thereto along the rotational axis;
- a first knife holder mounted on the first portion of the rotary head in a spaced relationship to the rotational axis and having means for mounting a knife on the rotary head for radial movement with respect to the rotational axis;
- a second knife holder mounted on the first portion of the rotary head in a spaced relationship to the rotational axis and a diametrically opposite relationship to the first knife holder; and
- an actuating mechanism including:
  - a cam actuator having a cam mounted on the second portion of the rotary head and a pair of cam followers mounted on the first portion of the rotary head to respectively move the first and second knife holders upon movement of the cam follower by the cam while maintaining a balanced relationship during rotation of the rotary head,
  - a drive operator that rotates the rotary head while also moving the rotary head axially along the rotational axis, and
  - a stop that limits the axial movement of the first head portion as the drive operator continues to move the second head portion axially during the rotation of the head such that the cam moves the cam followers and thereby moves the knife holders such that the knife held by the first knife holder cuts the blow molding and thereby provides finishing thereof by removing excess material.

20. Apparatus for finishing a blow molding comprising:
- a rotary head rotatable about a rotational axis adjacent a blow molding to be finished, said rotary head including a first portion and a second portion that supports the first portion for axial movement with respect thereto along the rotational axis, and a spring that biases the first and second head portions axially away from each other along the rotational axis;
- a first knife holder mounted on the first portion of the rotary head in a spaced relationship to the rotational axis and having means for mounting a knife on the rotary head for radial movement with respect to the rotational axis;
- a second knife holder mounted on the first portion of the rotary head in a spaced relationship to the rotational axis and a diametrically opposite relationship to the first knife holder; and
- an actuating mechanism including:
  - a cam actuator having a cam mounted on the second portion of the rotary head and a pair of cam followers mounted on the first portion of the rotary head to respectively move the first and second knife holders upon movement of the cam follower by the cam while maintaining a balanced relationship during rotation of the rotary head,
  - a drive operator including a cylinder that is extendable and retractable, a rotary arbor assembly having a first rotary member that is axially fixed and a second rotary member that is axially movable upon extension and retraction of the cylinder as well as a slide connection between the first and second rotary members, and the rotary head being mounted for rotation and axial movement on the second rotary member of the arbor assembly, and
  - a stop that extends from the first rotary member of the arbor assembly to the rotary head to limit axial movement of the first head portion upon extension of the cylinder as the second head portion continues to move axially against the bias of the spring of the rotary head as the cam moves the cam follower to thereby move the knife holder such that the knife holder cuts the blow molding and thereby provides finishing thereof by removing excess material.

21. Apparatus for finishing a blow molding comprising:
- a rotary head rotatable about a rotational axis adjacent a blow molding to be finished, said rotary head including a first portion and a second portion that supports the first portion for axial movement with respect thereto along a rotational axis, and a spring that biases the first and second head portions axially away from each other along the rotational axis;
- a pair of knife holders each of which includes a pivotal support on the first portion of the rotary head about a first pivotal axis that is spaced from the rotational axis of the rotary head in a parallel relationship, the pivotal axes of the pair of knife supports being in a diametrically opposite relationship to each other with respect to the rotational axis of the rotary head, and one of the knife holders including means for mounting a knife such that the knife is movable radially with respect to the rotational axis; and
- an actuating mechanism including:
- a cam actuator having a cam mounted on the second portion of the rotary head and a pair of cam followers each of which has an associated pivotal support that provides pivotal mounting thereof on the first portion of the rotary head about an associated second pivotal axis that is spaced from both the associated first pivotal axis of the knife holder and the rotational axis of the rotary head in a parallel relationship, and a coupling that connects each knife holder and the associated cam follower for pivotal movement with each other as the cam follower is pivoted by the cam upon movement of the first head portion with respect to the second head portion such that said one knife holder pivotally moves the knife carried thereby,
- a drive operator including a cylinder that is extendable and retractable, a rotary arbor assembly located within the cylinder and having a first rotary member that is axially fixed and a second rotary member that is axially movable upon extension and retraction of the cylinder, the arbor assembly also including a slide connection between the first and second rotary members, the rotary head being mounted for rotation and axial movement on the second rotary member of the arbor assembly, and the second rotary member of the arbor assembly having a central bore, a stop that extends from the first rotary member of the arbor assembly through the central bore of the second rotary member thereof to the rotary head and having a stop portion that limits axial movement of the first head portion upon extension of the cylinder as the second head portion continues to move axially against the bias of the spring of the rotary head as the cam moves the cam follower to thereby pivotally move the knife holders through the coupling such that he knife held by said one knife holder cuts the blow molding and thereby provides finishing thereof by removing excess material, and a slow down control that decreases the speed at which the drive operator moves the rotary head axially after the stop limits the axial movement of the first head portion to thereby decrease the speed at which the cam actuator moves the knife holder to perform the cutting.

22. Apparatus for finishing a blow molding comprising:

a rotary head rotatable about a rotational axis adjacent a blow molding to be finished, said rotary head including a first portion and a second portion that supports the first portion for axial movement with respect thereto along a rotational axis, and a spring that biases the first and second head portions axially away from each other along the rotational axis;

a first knife holder including a pivotal support for pivotally mounting a knife on the firs portion of the rotary head about a pivotal axis that is spaced from the rotational axis of the rotary head in a parallel relationship such that the knife is movable radially with respect to the rotational axis;

a second knife holder including a pivotal support on the first portion of the rotary head about a pivotal axis that is spaced from the rotational axis of the rotary head in a parallel relationship in a diametrically opposite relationship to the first knife holder;

an actuating mechanism including:

a cam actuator having a cam mounted on the second portion of the rotary head and a pair of cam followers having associated pivotal supports that provide respective pivotal mounting thereof on the first portion of the rotary head about the same pivotal axes as the pair of knife holders, a pair of support shafts that pivotally support and connect the pivotal supports of the associated knife holder and cam follower for pivoting about the common pivotal axis thereof to pivotally move each knife holder as the associated cam follower is pivoted by the cam upon movement of the first head portion with respect to the second head portion while maintaining a balanced relationship during rotation of the rotary head, a drive operator including a cylinder that is extendable and retractable, a rotary arbor assembly located within the cylinder and having a first rotary member that is axially fixed and a second rotary member that is axially movable upon extension and retraction of the cylinder, the arbor assembly also including a slide connection between the first and second rotary members, the rotary head being mounted for rotation and axial movement on the second rotary member of the arbor assembly, and the second rotary member of the arbor having a central bore, a stop that extends from the first rotary member of the arbor assembly through the central bore of the second rotary member thereof to the rotary head and having a stop portion that limits axial movement of the first head portion upon extension of the cylinder as the second head portion continues to move axially against the bias of the spring of the rotary head as the cam moves the pair of cam followers to thereby pivotally move the knife holders such that the knife held by the first knife holder cuts the blow molding and thereby provides finishing thereof by removing excess material, and a slow down control that decreases the speed at which the drive operator moves the rotary head axially after the stop limits the axial movement of the first head portion to thereby decrease the speed at which the cam actuator moves the knife holder to perform the cutting.

* * * * *

UNITED STATES PATENT AND TRADEMARK OFFICE
CERTIFICATE OF CORRECTION

PATENT NO. : 5,167,968            Page 1 of 2
DATED : December 1, 1992
INVENTOR(S): Richard L. Dunlap et al It is certified that error appears in the above-indentified patent and that said Letters Patent is hereby corrected as shown below:

Column 1, line 51, "holder" (first occurrence) should be

--holders--

Column 1, line 63, after "finished" insert a --.--

Column 2, line 1, after "respectively" insert --move--

Column 2, line 9, "holder" (1st occurrence) should be --holders--

Column 16, line 33, claim 12, after "common" insert --pivotal--

Column 16, line 38, claim 13, "bout" should be --about--

Column 17, line 7, claim 18, "flow" should be --slow--

Column 17, line 9, claim 18, "if" should be --of--

UNITED STATES PATENT AND TRADEMARK OFFICE
CERTIFICATE OF CORRECTION

PATENT NO. : 5,167,968
DATED : December 1, 1992
INVENTOR(S): Richard L. Dunlap et al It is certified that error appears in the above-indentified patent and that said Letters Patent is hereby corrected as shown below:

Column 17, line 10, claim 18, after which "eh" should be --the--.

Signed and Sealed this

Seventh Day of December, 1993

Attest:

BRUCE LEHMAN

Attesting Officer    Commissioner of Patents and Trademarks